United States Patent
Flynn

(10) Patent No.: US 6,899,360 B1
(45) Date of Patent: May 31, 2005

(54) HOSE WITH SERVICEABLE MOLDED-ON HOSE CLAMP

(75) Inventor: Robert Joseph Flynn, Farmington Hills, MI (US)

(73) Assignee: Avon Property Management Co., Cadillac, MI (US)

( * ) Notice: Subject to any disclaimer, the term of this patent is extended or adjusted under 35 U.S.C. 154(b) by 0 days.

(21) Appl. No.: 10/248,755

(22) Filed: Feb. 14, 2003

Related U.S. Application Data

(60) Provisional application No. 60/357,458, filed on Feb. 15, 2002.

(51) Int. Cl.$^7$ ................................................ F16L 25/00
(52) U.S. Cl. ........................... 285/420; 285/3; 285/252; 285/915
(58) Field of Search .......................... 285/23, 236, 420, 285/3, 252, 253, 242, 915; 156/66, 383; 138/99, 109

(56) References Cited

U.S. PATENT DOCUMENTS

| | | | |
|---|---|---|---|
| 3,365,218 A | * | 1/1968 | Denyes ....................... 285/253 |
| 5,002,094 A | | 3/1991 | Brovont |
| 5,145,218 A | | 9/1992 | Worley et al. |
| 5,234,233 A | | 8/1993 | Fix |
| 5,247,967 A | * | 9/1993 | Bourque ....................... 138/99 |
| 5,388,321 A | | 2/1995 | Farrell |
| 5,388,872 A | * | 2/1995 | Campo et al. ............... 285/253 |
| 5,456,784 A | | 10/1995 | Cogdill et al. |
| RE35,253 E | | 5/1996 | Worley et al. |
| 5,616,205 A | | 4/1997 | Cogdill et al. |
| 5,622,391 A | | 4/1997 | Belik |
| 5,706,862 A | * | 1/1998 | Meinerding, Sr. ............ 138/99 |
| 5,820,166 A | | 10/1998 | Webb |
| 5,915,739 A | | 6/1999 | Cradduck et al. |
| 6,390,136 B1 | * | 5/2002 | Hutchins et al. ............ 138/109 |
| 6,530,609 B1 | * | 3/2003 | Chatterton .................. 285/420 |
| 2004/0066033 A1 | * | 4/2004 | Rier et al. .................... 285/23 |

* cited by examiner

Primary Examiner—Aaron Dunwoody
(74) Attorney, Agent, or Firm—McGarry Bair PC

(57) ABSTRACT

A hose and clamp assembly comprises a hose, a band-type clamp encircling the hose, and an elastomeric envelope bonded to the hose and attaching the clamp to the hose along a section of the clamp band. The elastomeric envelope is provided with at least one discontinuity to define a removable center section whereby the removable center section can be separated along the at least one discontinuity to form an open channel in the envelope and enable removal of the clamp. The at least one discontinuity can comprise a groove or a plurality of perforations. The at least one discontinuity can comprise parallel grooves aligned with the edges of the clamp band to define the removable center section. A channel is formed in the envelope by the removal of the removable center section and the clamp to provide a receptacle for proper positioning of the replacement clamp on the hose.

15 Claims, 6 Drawing Sheets

HOSE WITH SERVICEABLE MOLDED-ON HOSE CLAMP

CROSS REFERENCE TO RELATED APPLICATIONS

This application claims the benefit of U.S. provisional application Ser. No. 60/357,458, filed Feb. 15, 2002, which is incorporated herein in its entirety.

BACKGROUND OF INVENTION

1. Field of the Invention

The invention relates to hose and clamp assemblies. In one aspect, the invention relates to a hose and clamp assembly in which a clamp is attached to a hose with an elastomeric envelope that is bonded to the hose and which comprises a removable portion to enable the clamp to be removed and replaced.

2. Description of the Related Art

A flexible hose and clamp assembly is commonly utilized to provide a fluid-tight connection of separate fluid-containing components. The opposite ends of the hose project over respective fittings on the components to a sufficient extent to enable a subsequently installed hose clamp to tightly engage the hose end about the fitting for a fluid-tight connection. It is common to provide the hose and clamp assembly with clamps that are securely attached at the proper position on the end of the hose to ensure that the clamp is readily available when needed and in the proper position for producing a fluid-tight connection when the hose and clamp assembly is installed.

One such device and method for providing a clamp attached to a hose is described in U.S. Pat. No. 5,002,094, entitled "Hose And Clamp Assembly And Method For Making The Same," issued to D. A. Brovont on Mar. 26, 1991, which is incorporated herein by reference.

U.S. Pat. No. 5,002,094 describes a hose and clamp assembly in which a conventional hose clamp is attached to the hose along a section of the clamp band with an elastomeric envelope that envelops the clamp band and is bonded to the hose. The elastomeric envelope may be adhesively bonded to or integrally vulcanized on the hose, and thus retains the clamp in the proper circumferential and longitudinal position on the hose. The elastomeric envelope is of a strength and thickness sufficient to keep the clamp from being accidentally removed from the hose assembly.

There are times when it is desirable to remove and replace the clamp, such as when the clamp breaks, or becomes corroded or rusted so as to be unusable. In such circumstances, it is necessary to remove at least that portion of the elastomeric envelope overlying the clamp in order to remove the clamp. However, the elastomeric envelope is generally of such a thickness and strength that the elastomeric envelope cannot be torn away to enable the removal of the overlying portion. Thus, the overlying portion must be cut away with a sharpened implement, such as a utility knife, a difficult and time consuming process. if care is not taken during the cutting process, the hose can be damaged. if the entire elastomeric envelope is cut away, the replacement clamp may be placed on the hose in the wrong position for a fluid-tight connection when the hose and clamp are reinstalled on the fitting. As an alternative to selective removal of the clamp, the entire hose and clamp assembly can be removed and discarded. However, this results in unacceptable waste if the hose and one of the clamps are still usable.

Therefore, it would be useful to provide an elastomeric envelope having a portion overlying the clamp band which is easily removable so that the clamp can be readily removed and replaced with a new clamp in the proper position on the hose to provide a fluid-tight connection when the hose and clamp assembly is reinstalled.

SUMMARY OF THE INVENTION

A hose and clamp assembly comprises a hose, a band-type clamp encircling the hose, and an elastomeric envelope bonded to the hose and attaching the clamp to the hose along a section of the clamp band. The elastomeric envelope is provided with at least one discontinuity to define a removable center section whereby the removable center section can be separated along the at least one discontinuity to enable removal of the clamp. The at least one discontinuity can comprise a groove or a plurality of perforations. The at least one discontinuity can comprise parallel grooves aligned with the edges of the clamp band to define the removable center section. An open channel is formed in the envelope by the removal of the removable center section and the clamp to provide a receptacle for proper positioning of a replacement clamp on the hose.

In another embodiment, a clamp is positioned against a substrate whereby the clamping force can be selectively increased or decreased, and an envelope encapsulates a portion of-the clamp and is bonded to the substrate for retaining the clamp against the substrate, wherein the envelope comprises at least one discontinuity so that a portion of the envelope can be separated along the at least one discontinuity to enable removal of the clamp.

In yet another embodiment, a clamp retainer and replacement system for retaining a clamp against a substrate with an envelope and enabling replacement of the clamp by removing a portion of the envelope with a cutting tool comprises a clamp adapted to be positioned against the substrate whereby the clamping force can be selectively increased or decreased, an envelope encapsulating a portion of the clamp and adapted to be bonded to the substrate for retaining the clamp against the substrate wherein the envelope comprises parallel grooves to enable a removable center section of the envelope to be separated along the parallel grooves, and a cutting tool comprising at least one cutter blade adapted to sever the removable center section along the parallel grooves and thereby enable the removal of the removable center section and the clamp. The cutting tool can comprise a contact block for controlling the penetration of the at least one cutter blade through the envelope.

DETAILED DESCRIPTION

Figure 1:
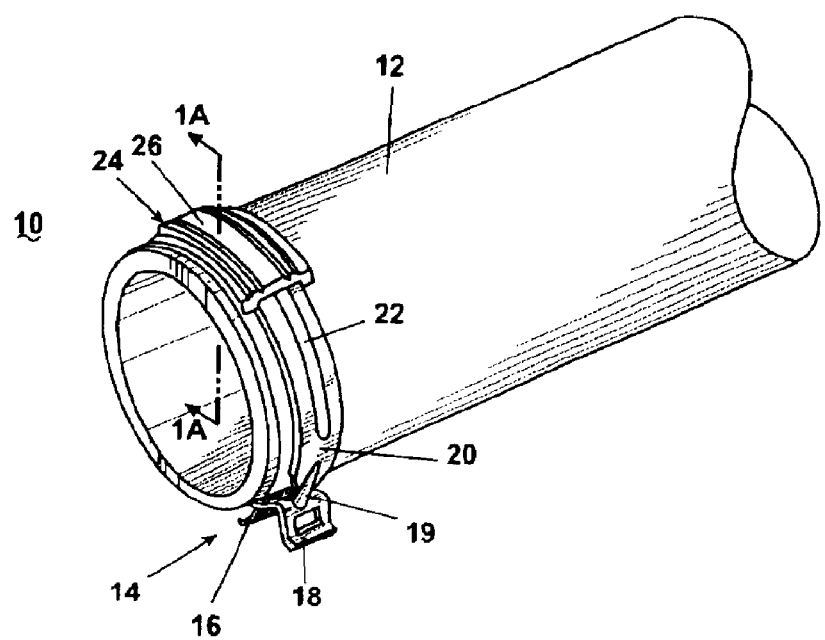
FIG. 1 is a perspective view of a section of a hose and clamp assembly according to the invention.

Turning to the drawings, and in particular to FIG. 1, the invention comprises a hose and clamp assembly designated generally by the reference numeral 10, comprising a hose 12, a hose clamp 14, and an elastomeric envelope 24. The elastomeric envelope 24 has a-weakened area for selective removable of a portion of the envelope for replacement of the hose clamp 14. A cutting tool can be used to remove the removable portion to facilitate removal and replacement of the clamp 14, as hereinafter described.

The clamp 14 is attached to the hose 12 through an elastomeric envelope 24 that overlies a portion of the clamp band 20. Hose and clamp assemblies for use in engine coolant hoses, fuel filler hoses, fuel line hoses, air induction hoses, transmission lines, air injection tubes, drain hoses, washing machine hoses, and fluid or air conveyance tubes or hoses generally can be assembled according to the invention. Any clamp, preferably having at least one hole, notch, slot or perforation in the band or having a lug, clamp screw housing, socket, or similar means for enabling or facilitating the tightening of the clamp around the end of a hose can be suitably employed according to the invention. In the embodiments shown in FIGS. 1–4, the hose clamp 14 comprises a conventional radiator hose POPP clamp 14 having a clamp band 20 with a tongue flange 16 at one end and a holding flange 18 at another end. The tongue flange 16 is received in a slot 22 and has a shoulder 18 abuts the holding flange 18 when the clamp is in an open condition around the hose 12.

The clamp 14 is formed of any suitable metallic material that has natural spring force to tend to circumferentially move apart a pair of end portions 16 and 18 thereof so as to shrink the defining circumference of an annular band 20 thereof from a relatively large circumference defined thereby when the ends 16 and 18 are toggled together in the manner illustrated in FIG. 1 to a smaller diameter configuration when the end projections 16 and 18 are released from each other so that the clamp will move to its clamping condition in a manner well known in the hose construction art. See, for example, Muhr U.S. Pat. No. 4,773,129 and Hashimoto et al. U.S. Pat. No. 4,425,682, which are incorporated herein by reference. See also the Worley et al. U.S. Pat. No. 5,145,218 and the Cogdill et al. U.S. Pat. No. 5,616,205. The hose clamp 14 can be any suitable type of clamp as, for example disclosed in the Fix U.S. Pat. No. 5,234,233, which is incorporated herein by reference. These clamps include the screw clamps and POPP clamps.

Figure 1A:
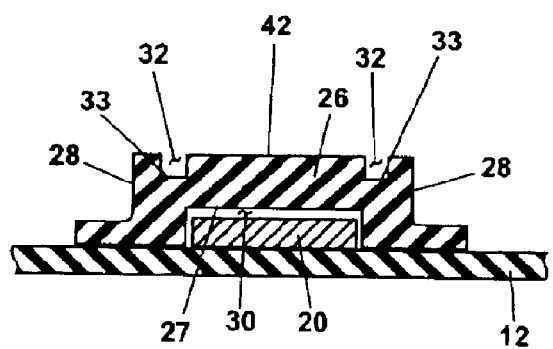
FIG. 1A is a cross-sectional view of the hose and clamp assembly of FIG. 1 taken along line 1A—1A.
Figure 2:
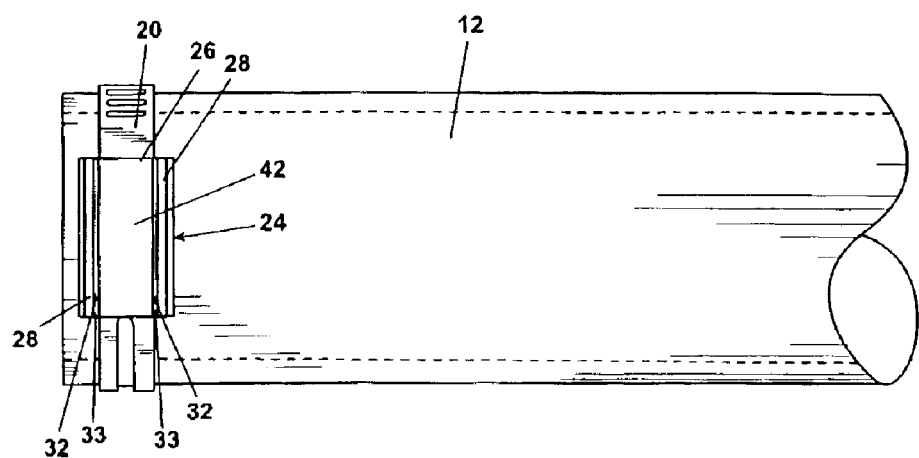
FIG. 2 is a plan view of the hose and clamp assembly of FIG. 1 showing the alignment of the groves in the elastomeric envelope.

As shown in FIGS. 1A and 2, the elastomeric envelope 24 comprises a top wall 26 having an undersurface 27, and lateral walls 28 extending generally downwardly orthogonal to the top wall 26. The lateral walls 28 are bonded to the outer surface of the hose 12, thereby creating a closed channel 30 extending between the opposite ends of the envelope 24 and oriented along the circumference of the hose 12. The channel 30 forms an elongated passageway in which the clamp band 20 is received.

Figure 3:
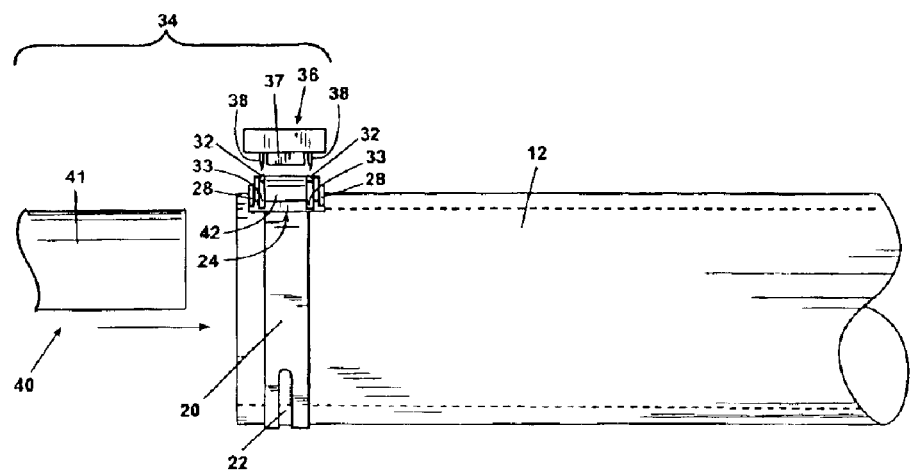
FIG. 3 is a side elevational view of the hose and clamp assembly of FIG. 2 showing a cutting tool positioned to cut the elastomeric envelope for removal of the clamp.

The envelope 24 is provided with at least one discontinuity in the top wall 26 comprising in this first embodiment a pair of parallel grooves 32 in spaced-apart relationship extending downwardly from the top wall 26 toward the undersurface 27 and having a lower groove floor 33. The grooves 32 extend circumferentially between the opposite ends of the envelope 24. As shown in FIG. 3, the grooves 32 are generally in vertical alignment with the edges of the clamp band 20 and define an envelope center portion 42.

As described in U.S. Pat. No. 5,002,094, the envelope is either bonded to the hose by vulcanization or an adhesive. The hose 12 and the envelope 24 are preferably fabricated of the same elastomeric material, although the hose 12 and envelope 24 can comprise different materials. Suitable elastomeric materials include, but are not limited to, ethylene propylene terpolymer, butadiene acrylonitrile, chlorosulfonated polyethylene, chloroprene, epichlorohydrin, polyisoprene, styrene butadiene, chlorinated polyethylene, ethylene acrylic, polysiloxanes, fluorosilicones, polyacrylates, and fluoronated hydrocarbons.

As shown in FIG. 3, a cutting tool 34 comprises a cutter head 36 and a cutter support base 40 for cutting through the top wall 26 to remove the center portion 42. The cutter head 36 is a rigid block-like member adapted to rigidly hold two cutter blades 38 in a spaced-apart parallel alignment corresponding generally to the spaced-apart alignment of the grooves 32. The blades 38 are separated from each other a distance generally equal to the distance separating the grooves 32 so that the blades 38 are received within the grooves 32 when the cutter head 36 is brought into engagement with the envelope 24. In the preferred embodiment, the width of the cut defined by the blades 38 is 0.5 millimeters less than the width of the clamp band 20.

The cutter head 36 is also provided with a contact block 37 located intermediate the blades 38 and extending the length of the cutter head 36. The cutter blades 38 are positioned relative to the contact block 37 so that when the contact block 37 is brought into contact with the top wall 26 the blades 38 penetrate through the portion of the envelope 24 overlying the band 20 sufficient to separate the center portion 42 from the rest of the top wall 26 but without penetrating into the hose 12.

The cutter support base 40 comprises a rigid elongated member having an upper arcuate surface 41 and adapted to be inserted into the hose 12 to support the hose 12 and envelope 24 during the envelope cutting process. The hose 12 rests upon the support base 40 so that the downward pressure of the cutter head 36 against the envelope 24 can be resisted in order to facilitate an accurate cut. The cutting tool 34 can be adapted to be utilized in an automated, power driven device, or operated by hand.

Figure 4:
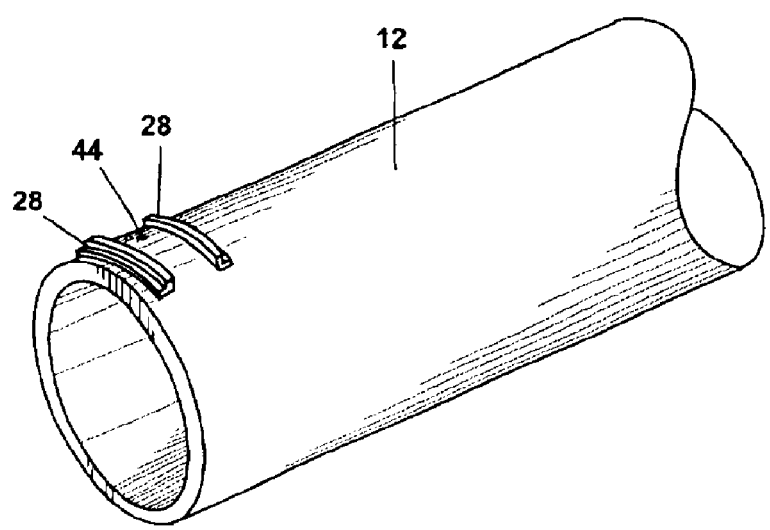
FIG. 4 is a perspective view of the hose of FIG. 1 showing a channel formed in the elastomeric envelope after a portion of the elastomeric envelope and the clamp have been removed.

In operation, the hose end is typically removed from the associated fitting, and the cutter support base 40 is inserted into the hose 12 to contact the interior of the hose adjacent to the envelope 24. The hose 12 is held against the cutter support base 40 to provide a solid base against which the cutter head 31 can operate during the cutting procedure. The cutter head 36 is then used to cut through the groove floors 33 to separate the center portion 42 from the rest of the envelope 24. The grooves 32 are utilized to properly align the cutter head 36 relative to the center portion 42. The depth of cut is controlled by bringing the contact block 37 into contact with the top wall 26. After the cutting operation has been completed, the center portion 42 can be readily removed, exposing the clamp band 20 and enabling the removal of the clamp 14 from the hose 12. As shown in FIG. 4, the removal of the center portion 42 and the clamp 14 forms an open channel 44 for removal of a defective band and for receipt of a replacement clamp 14, which is properly positioned with respect to the end of the hose 12 by receipt of the clamp band 20 in the channel 44.

Figure 5:
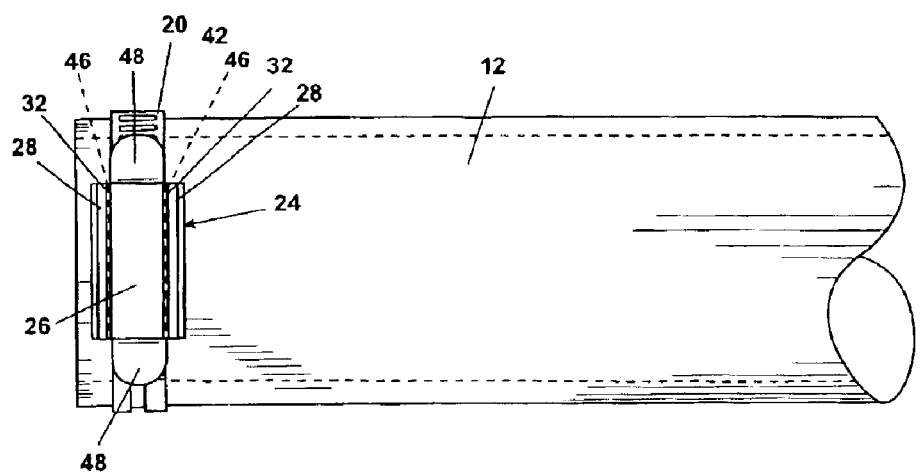
FIG. 5 is a plan view of the hose and clamp assembly according to a second embodiment of the invention.
Figure 6:
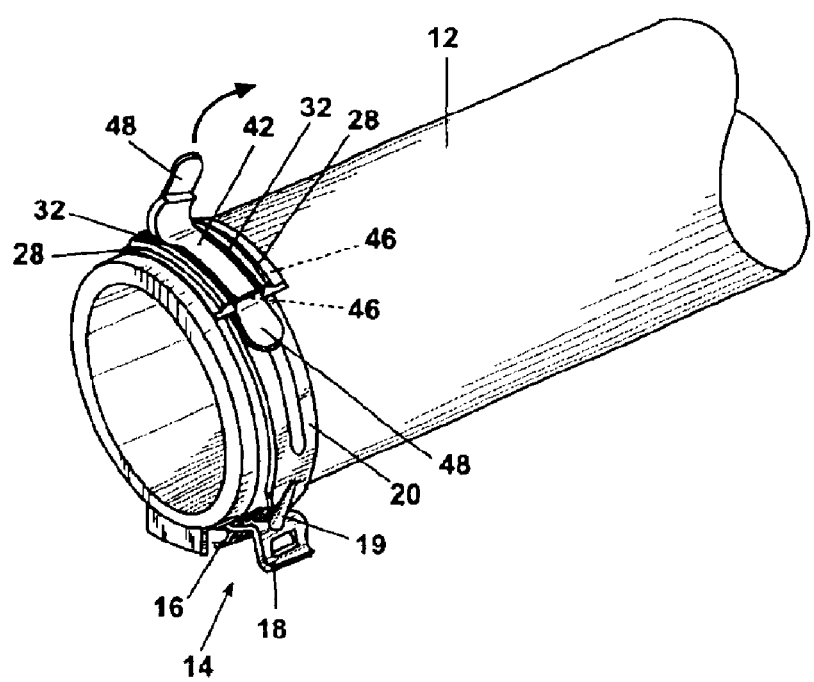
FIG. 6 is a perspective view of the hose and clamp assembly of FIG. 5 showing a center portion of the elastomeric envelope being pulled away from the hose.

Referring now to FIGS. 5 and 6, a second embodiment of the invention is shown. The envelopes in both embodiments are similar except that in the second embodiment a plurality of perforations 46 penetrates the envelope 24 in a line along each groove 32 extending from the floor 33 of the groove 32 to the closed channel 30. The perforations 46 are adapted in size and spacing to enable the center section 42 to be readily pulled from the remainder of the envelope 24 without the use of a cutting tool, while providing sufficient strength to maintain the attachment of the center section 42 to the envelope 24 to secure the clamp 14 onto the hose 12 until it is desirable to selectively remove the center section 42. At least one pull tab 48 is provided at least one end of the center section 42 to facilitate grasping and pulling of the center section 42 to remove the center section 42 from the envelope 24. As with the first embodiment, upon removal of the center section 42, the clamp 14 can be removed and replaced. The channel 44 formed by removal of the center portion 42 and the clamp 14 provides for proper positioning of a replacement clamp with respect to the end of the hose 12.

The removable patch retains the advantages of attaching the clamp to the hose, but provides a convenient means of removing the clamp from the hose when the clamp must be replaced. The specialized cutting tool provides for an efficient and accurate means of removing the center section of the envelope. The grooves in the envelope facilitate the proper alignment of the cutting tool with the clamp band, and the effective removal of that portion of the envelope necessary for removal of the clamp. The channel formed by the removal of the center section of the envelope provides a convenient means of properly positioning a replacement clamp on the hose to ensure the proper securing of the hose to the associated fitting in order to maintain a fluid-tight connection. Alternatively, the use of perforations along the grooves and a pull-tab enable the center portion of the envelope to be removed without the necessity of a cutting tool.

While particular embodiments of the invention have been shown, it will be understood that the invention is not limited thereto. Reasonable variation and modification are possible within the scope of the foregoing disclosure and drawings, particulary in light of the foregoing teachings, without departing from the spirit of the invention which is defined in the appended claims.

What is claimed is:

1. In a hose and clamp assembly comprising:
   a hose;
   a clamp encircling a portion of the hose; and
   an elastomeric envelope bonded to the hose and encapsulating only a portion of the clamp;
   the improvement comprising:
   the envelope has in an outer radial surface thereof at least one circumferential groove or a plurality of circumferentially spaced perforations that facilitates the separation of a portion of the envelope along the at least one circumferential groove or circumferentially spaced perforations to enable removal and replacement of the clamp.

2. The hose and clamp assembly of claim 1 wherein the at least one circumferential groove comprises parallel circumferential grooves in a top surface of the envelope aligned with the edges of the clamp to define a removable center section to enable removal and replacement of the clamp.

3. The hose and clamp assembly of claim 2 wherein an open channel is formed in the envelope by the removal of the removable center section and the clamp to provide a receptacle for proper positioning of a replacement clamp on the hose.

4. The hose and clamp assembly of claim 1 wherein the envelope is formed of the same material as the hose.

5. The hose and clamp assembly of claim 1 wherein the hose is a rubber automotive coolant hose.

6. The hose and clamp assembly of claim 1 wherein the hose is an automotive fuel filler hose.

7. A clamp assembly for applying a clamping force against a hose, comprising:
   a clamp positioned against the hose for applying a clamping force to the hose; and
   an envelope encapsulating a portion of the clamp and bonded to the hose for retaining the clamp against the hose;
   wherein the envelope comprises in an outer radial surface thereof at least one discontinuity in the form of a circumferential groove or a plurality of circumferential perforations so that a portion of the envelope can be separated along the at least one discontinuity to enable removal and replacement of the clamp.

8. The clamp assembly of claim 7 wherein the at least one discontinuity comprises parallel circumferential grooves in a top surface of the envelope aligned with the edges of the clamp to define a removable center section to enable removal and replacement of the clamp.

9. The clamp assembly of claim 8 wherein an open channel is formed in the envelope by the removal of the removable center section and the clamp to provide a receptacle for proper positioning of a replacement clamp on the hose.

10. The clamp assembly of claim 7 wherein the envelope is formed of the same material as the substrate.

11. The hose and clamp assembly of claim 7 wherein the hose is a rubber automotive coolant hose.

12. The hose and clamp assembly of claim 7 wherein the hose is an automotive fuel filler hose.

13. A clamp retainer and replacement system for retaining a clamp against a substrate with an envelope and enabling replacement of the clamp by removing a portion of the envelope with a cutting tool, comprising
   a clamp positioned against the substrate for applying a clamping force to the substrate;
   an envelope encapsulating a portion of the clamp and bonded to the substrate for retaining the clamp against the substrate wherein the envelope comprises at least one groove or a plurality of circumferential perforations to enable a center section of the envelope to be separated along the groove; and
   a cutting tool comprising at least one cutter blade adapted to sever the removable center section along the at least one groove or circumferential perforations and thereby enable the separation of the center section from the envelope and removal of the clamp.

14. The clamp retainer and replacement system of claim 13 wherein the cutting tool further comprises a contact block for controlling the penetration of the at least one cutter blade through the envelope.

15. The clamp retainer and replacement system of claim 13 wherein there are two grooves or circumferential perforations that are parallel to each other and the cutting tool has two cutter blades spaced apart a distance to register with the two grooves or circumferential perforations, and the two cutter blades are adapted to simultaneously sever the envelope at the two parallel groves or circumferential perforations.

* * * * *